T. BEATTY
Felloe-Plates.

No. 165,656. Patented July 20, 1875.

Witnesses
B. C. Pole
A. K. Parris

Inventor
Thornton Beatty
by C. S. Whitman atty

UNITED STATES PATENT OFFICE.

THORNTON BEATTY, OF VERMILLION, ILLINOIS.

IMPROVEMENT IN FELLY-PLATES.

Specification forming part of Letters Patent No. 165,656, dated July 20, 1875; application filed March 16, 1875.

*To all whom it may concern:*

Be it known that I, THORNTON BEATTY, of Vermillion, county of Edgar and State of Illinois, have invented an Improved Metal Felly-Cover.

The following description, taken in connection with the accompanying plate of drawings, hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to that class of wheels which are used on vehicles; and the nature thereof consists in certain improvements in the construction of the fittings of the same, hereinafter shown and described.

Figure 1:
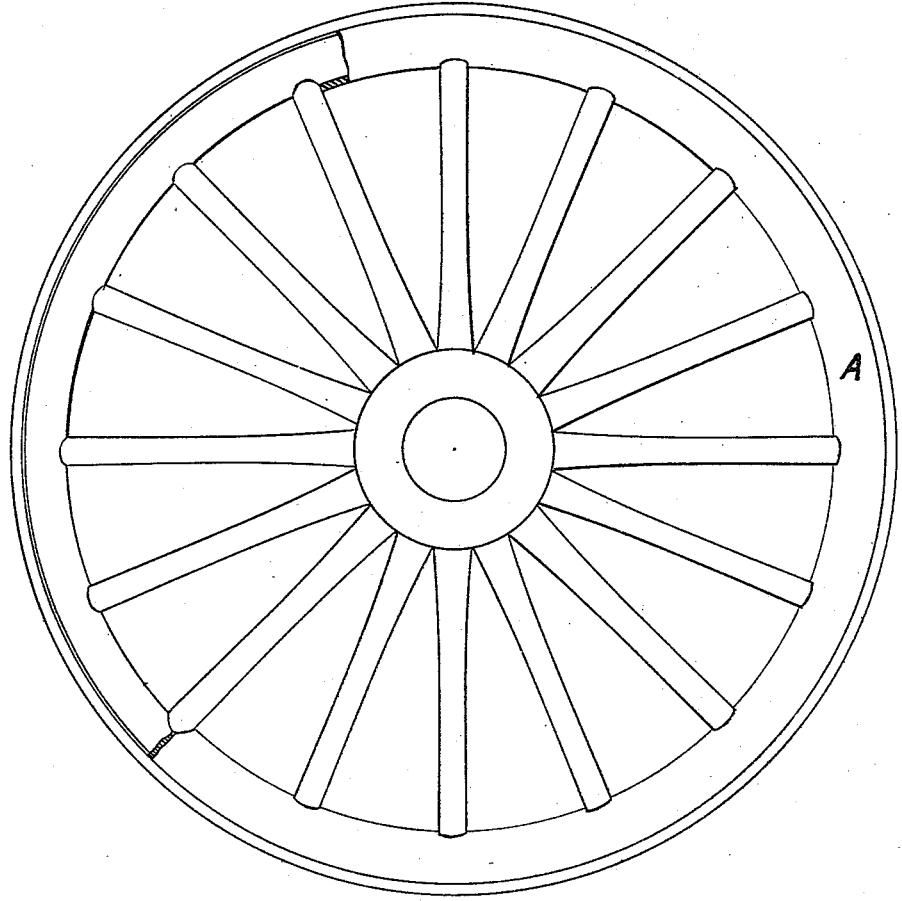
Figure 2:
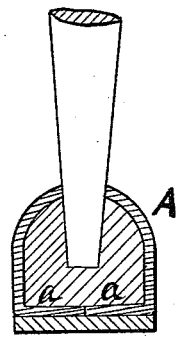

In the accompanying plate of drawings, Figure 1 represents the wheel of a vehicle, partially in section, having my improvement applied thereto. Fig. 2 is a transverse section.

In the said drawings, A designates a metal covering of such size and shape as to exactly fit the exterior surface of the felly. The said casing A entirely incloses and surrounds the felly, and is held in position by bolts, which pass through the tire and through the parts *a* of said casing. The said parts *a* inclose the outer periphery of the wheel, as is clearly represented in Fig. 2. Before being applied to the wheel, the casing is pressed into proper shape by a machine or otherwise.

I am aware that wheels have been heretofore provided with metal fellies. See, for instance, the patent to S. R. Bryant of June 28, 1870.

I claim and desire to secure by Letters Patent of the United States—

In a vehicle-wheel, the combination of the following elements: first, the tire; second, the felly; third, the casing A, having inwardly-projecting cylindrical parts *a*, and entirely inclosing and exactly fitting the exterior surface of the felly, as and for the purposes described.

In testimony that I claim the foregoing I have hereunto set my hand this 5th day of March, 1875.

THORNTON BEATTY.

Witnesses:
SYRENE BRUMMET,
J. C. BESIER.